United States Patent [19]

Smith

[11] Patent Number: 5,297,665
[45] Date of Patent: Mar. 29, 1994

[54] VEHICLE WITH MULTIPLE SERVING CONVEYORS

[76] Inventor: Roger G. Smith, 17693 SW. Blue Heron Rd., Lake Oswego, Oreg. 97034

[21] Appl. No.: 38,255

[22] Filed: Mar. 29, 1993

[51] Int. Cl.⁵ .............................................. B65G 15/26
[52] U.S. Cl. .................................... 198/313; 198/318; 198/317; 198/632; 198/861.2; 198/861.4
[58] Field of Search ............... 198/312, 313, 314, 315, 198/317, 318, 861.4, 861.5, 861.6, 861.2, 632, 508; 414/523, 528

[56] References Cited

U.S. PATENT DOCUMENTS

| | | | |
|---|---|---|---|
| 923,868 | 6/1909 | Lyback | 198/318 X |
| 1,110,239 | 9/1914 | Steever | 198/313 X |
| 1,576,910 | 3/1926 | Hudson | 198/313 |
| 2,743,932 | 5/1956 | Wester | 198/313 X |
| 2,782,943 | 2/1957 | Jones et al. | 198/313 X |

FOREIGN PATENT DOCUMENTS 0118612  7/1984  Japan ................................ 198/318

Primary Examiner—Cheryl L. Gastineau
Attorney, Agent, or Firm—Kolisch, Hartwell, Dickinson, McCormack & Heuser

[57] ABSTRACT

A conveyor vehicle having a pair of lateral-feeding conveyors which in a road transport position extend longitudinally along opposite sides of a vehicle frame. A longitudinally-feeding conveyor has a road transport position stacked above the lateral-feeding conveyors. The conveyors have mountings mounting them for pivotal movement to place them in set up positions and expanses of the conveyors fold over to attain compactness.

8 Claims, 3 Drawing Sheets

VEHICLE WITH MULTIPLE SERVING CONVEYORS

BACKGROUND AND SUMMARY OF THE INVENTION

This invention relates to a vehicle equipped with a conveyor system. The vehicle is movable from one site to another, and the conveyors of the conveyor system then may be set up whereby they may perform their conveying function. A vehicle of this description is referred to herein as a conveyor vehicle.

Describing with more particularity a conveyor vehicle as contemplated herein, in the construction business the need arises for a conveyor system capable of handling differently sized material delivered to a loading zone by transporting this material to different stockpile regions dependent upon the size of material handled. For instance, in the handling of crushed rock and gravel, as is done in the road construction business, frequently crushed material is screened in a screener with material of different size ranges falling from the screener at different locations, then to be carried away from the screener for deposit in distinct stockpiles. In preparing multiple stock piles, maximum production and efficiency are attained if stockpiles produced pursuant to this type of operation have substantial size and contain a large quantity of material. Directly affecting the height and distance separating different piles are the length of the conveyors utilized in conveying away the separated material, and the elevation obtainable in the discharge ends of the conveyors. It should be obvious that a conveyor that conveys material a considerable distance away from the screening operation and permits such material to cascade from a point of discharge having considerable elevation over the ground, produces a substantially larger stockpile than a conveyor of shorter length and having a lower discharge elevation.

A general object of this invention is to provide a conveyor vehicle which includes a mobile vehicle frame adapted for road transport, and a conveyor system of multiple conveyors supported on the vehicle frame featuring a construction which enables relatively long conveyors in the conveyor system to be compactly arranged with the vehicle set up for travel over the road.

Another object is to provide a conveyor vehicle where the vehicle includes multiple conveyors supported on the vehicle frame which are relatively easily adjusted between a road transport position with the conveyors compactly arranged in a supported position on the frame, and a set up position, where the conveyors extend outwardly to the sides and to different regions around the vehicle frame in an optimum position for stockpiling material.

A vehicle as contemplated has good roadability with the conveyors of the vehicle arranged in a road transport position. With the conveyors so arranged, the vehicle is stable without excessive width or height, and easily moved over the highway at conventional highway speeds. With the vehicle moved to a construction site, adjustments are readily made to place the conveyors in a set up position, whereby they may be operated to perform their stockpiling function.

In a particular and preferred embodiment of the invention, the conveyor vehicle has three different conveyors in the conveyor system of the vehicle, namely two lateral-feeding conveyors and a longitudinal-feeding conveyor. With the conveyors in a road transport position to ready the vehicle for moving over the road, the conveyors all occupy a position extending longitudinally along the vehicle frame. In a set up position, the lateral-feeding conveyors are swung to extend outwardly to opposite sides of the vehicle frame and upwardly to a raised elevation. The longitudinal-feeding conveyor is swung to raise its discharge end. All three conveyors are supplied with material to be conveyed at a region located adjacent one end of the vehicle frame. From this region the various conveyors convey different size ranges of material outwardly to different zones to produced the desired stockpiles.

BRIEF DESCRIPTION OF THE DRAWINGS

These and other objects and advantages are attained by the invention, which is described hereinbelow in conjunction with the accompanying drawings, wherein.

Detailed Description of the Preferred Embodiment

Figure 1:
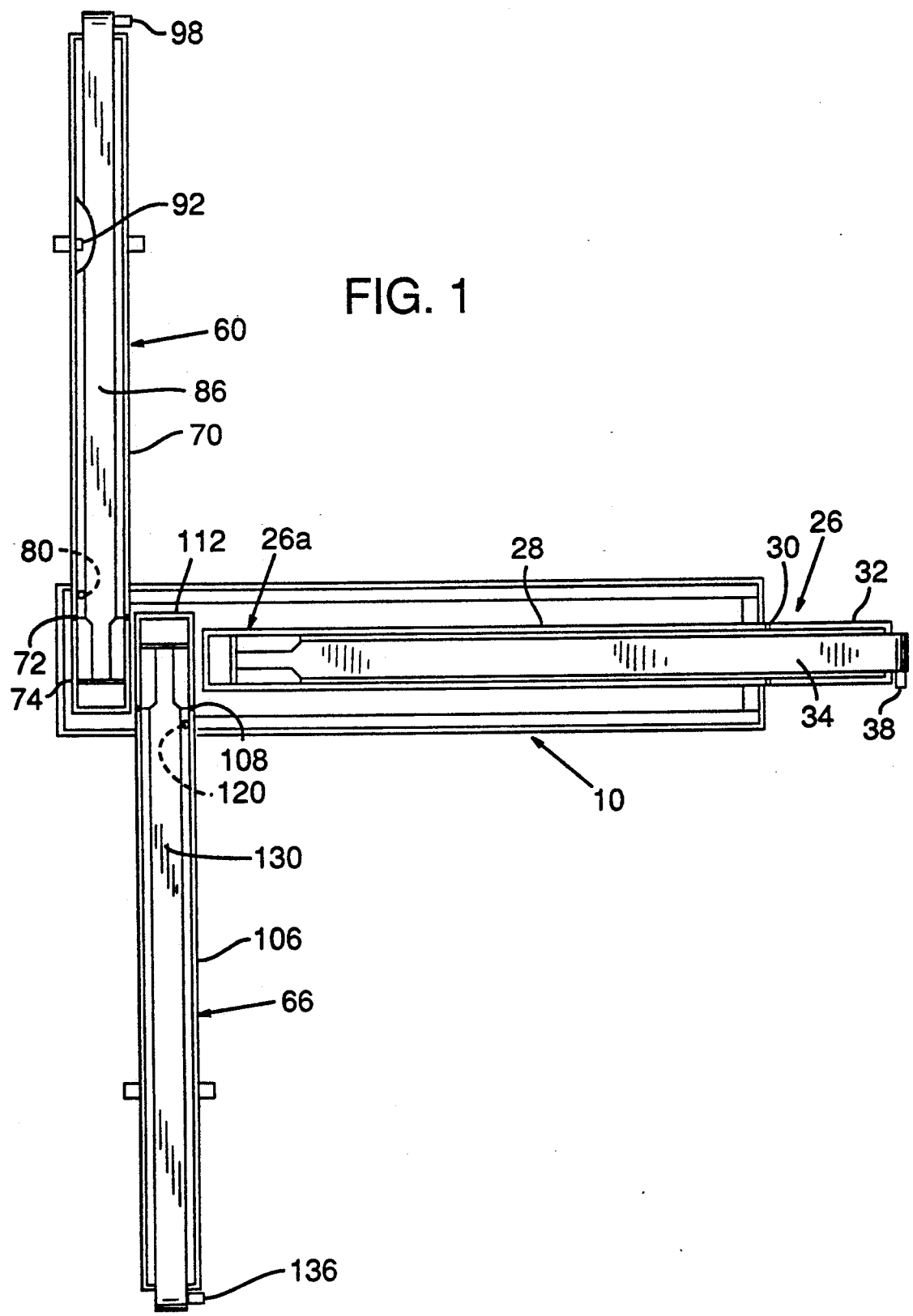
FIG. 1 is a plan view of a vehicle constructed as contemplated, and showing the vehicle with conveyors in their setup position.

Referring now to the drawings, the vehicle in the preferred embodiment illustrated takes the form of a trailer adapted to be detachably coupled to a tractor vehicle for the purpose of moving the vehicle from one location to another. Thus the vehicle includes an elongate trailer or vehicle frame 10 supported for movement over the ground by wheels or wheel support 12 suitably mounted on the underside of the vehicle frame. The forward end of the frame has coupling means 14 for detachably coupling the vehicle frame to a towing vehicle, such as the tractor vehicle partially shown at 15.

With the vehicle at a construction site and set up in a working condition, the vehicle frame is leveled and blocked properly to stabilize the frame. Such may be done utilizing adjustable jacks 16 mounted on the underside of the vehicle toward its forward end, and stanchions 20 extending downwardly from the vehicle frame at the frame's rear end. Shown blocking the stanchions is a beam 21.

Figure 4:
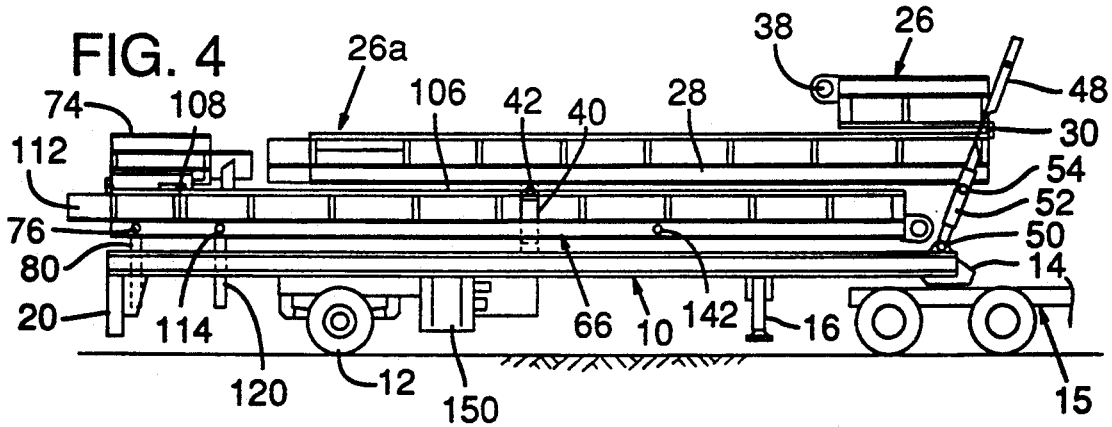
FIG. 4 is a side view of the vehicle with all conveyors in their road transport position.

In the vehicle illustrated, three elongate conveyors have been provided which, with the vehicle in the condition illustrated in FIG. 4, occupy a closely stacked position on top of the vehicle frame. The conveyors in this position occupy what is referred to herein as their road transport position. The conveyors are adjustable or movable from this position, to their so-called set up position, which is the position of the conveyors illustrated in FIGS. 1 and 2.

Further explaining, one of the conveyors above discussed is indicated at 26. The conveyor is located centrally on the vehicle, and is referred to herein as a longitudinal-feeding conveyor.

The conveyor includes an elongate conveyor frame 28. Pivotally mounted at 30 to the forward end of this conveyor frame is a supplemental or foldable frame 32. Pivot mounting 30 accommodates swinging of the supplemental frame about a horizontal transverse axis to shift the supplemental frame section from the folded over position shown in FIG. 4 to the unfolded position shown in FIGS. 2 and 3 where the frame forms a forward extension of main conveyor frame 28.

The conveyor further includes a conveyor belt 34 for conveying material. Supporting the belt for movement along the frame are the usual guide rollers or other suitable means. A hydraulic motor 38 when energized powers movement of the belt. In its set up or operative position, supplemental frame 32 forms an extension of the main conveyor frame 28, and the conveyor belt produces travel of material throughout the entire length of these two frames, with powered movement provided by motor 38.

The longitudinal-feeding conveyor is located approximately midway between opposite sides of the vehicle frame. With the conveyor in its road transport position, frame 28 is substantially horizontal. A rear portion of frame 28 is supported on the vehicle frame by pillar structure 40, with pivot mounting 42 pivotally mounting the conveyor frame on an upper part of the pillar structure.

A brace frame 48 is pivotally connected at 50 to the forward end of the vehicle frame. Sleeve 52 movable along the length of frame 48 is pivotally connected at 54 to frame 28. With sleeve 52 moved to the upper end of frame 48 and fixed in this position, frame 28 of the conveyor is held in an upwardly inclined position.

To shift the longitudinal-feeding conveyor from the road transport position illustrated in FIG. 4, to its set up or operative condition, frame 32 is swung about pivot mounting 30 to an unfolded condition, whereby it extends outwardly in alignment with the main conveyor frame 28. Frame 32 and that portion of belt 34 which is supported thereby may be thought of as an end expanse of conveyor 26. The conveyor frame and supplemental frame are swung to an inclined position about pivot mounting 42 and held there with sleeve 52. Upward swinging of the off-bearing end of conveyor 26 has the effect of lowering the infeed end of the longitudinal-feeding conveyor, shown at 26a, to place such infeed end directly above the vehicle frame. Because of the overall length of this conveyor when in its set up position, and the upward incline imparted to the conveyor, the conveyor is operable to produce from material cascading from its outfeed end a pile of material of considerable size and located at a considerable distance from the feed or access zone of the vehicle, which is roughly that part of the vehicle disposed above the vehicle frame and located rearwardly of supporting wheels 12.

In addition to the longitudinal-feeding conveyor, the vehicle includes two lateral-feeding conveyors, designated at 60 and 66 respectively.

Figure 5:
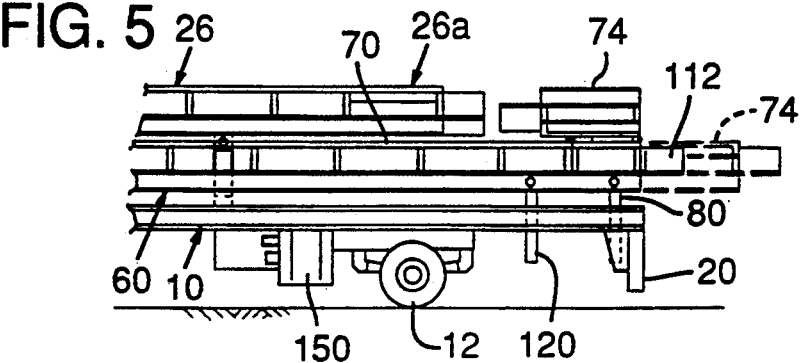
FIG. 5 is a side elevation, taken generally along the line 5—5 in FIG. 3.

Considering initially lateral-feeding conveyor 60, with the conveyor lowered or in its road transport position (shown in FIGS. 3, 4 and 5), the conveyor extends along one side of the vehicle frame in a substantially horizontal position. The conveyor includes a main conveyor frame 70. Pivotally connected at pivot 72 for relative movement about a horizontal axis is a supplemental frame 74. The supplemental frame is pivotally mounted for movement from the folded position as shown in FIG. 5, to a position where it forms an extension of conveyor frame 70, as shown in FIG. 1.

Figure 6:
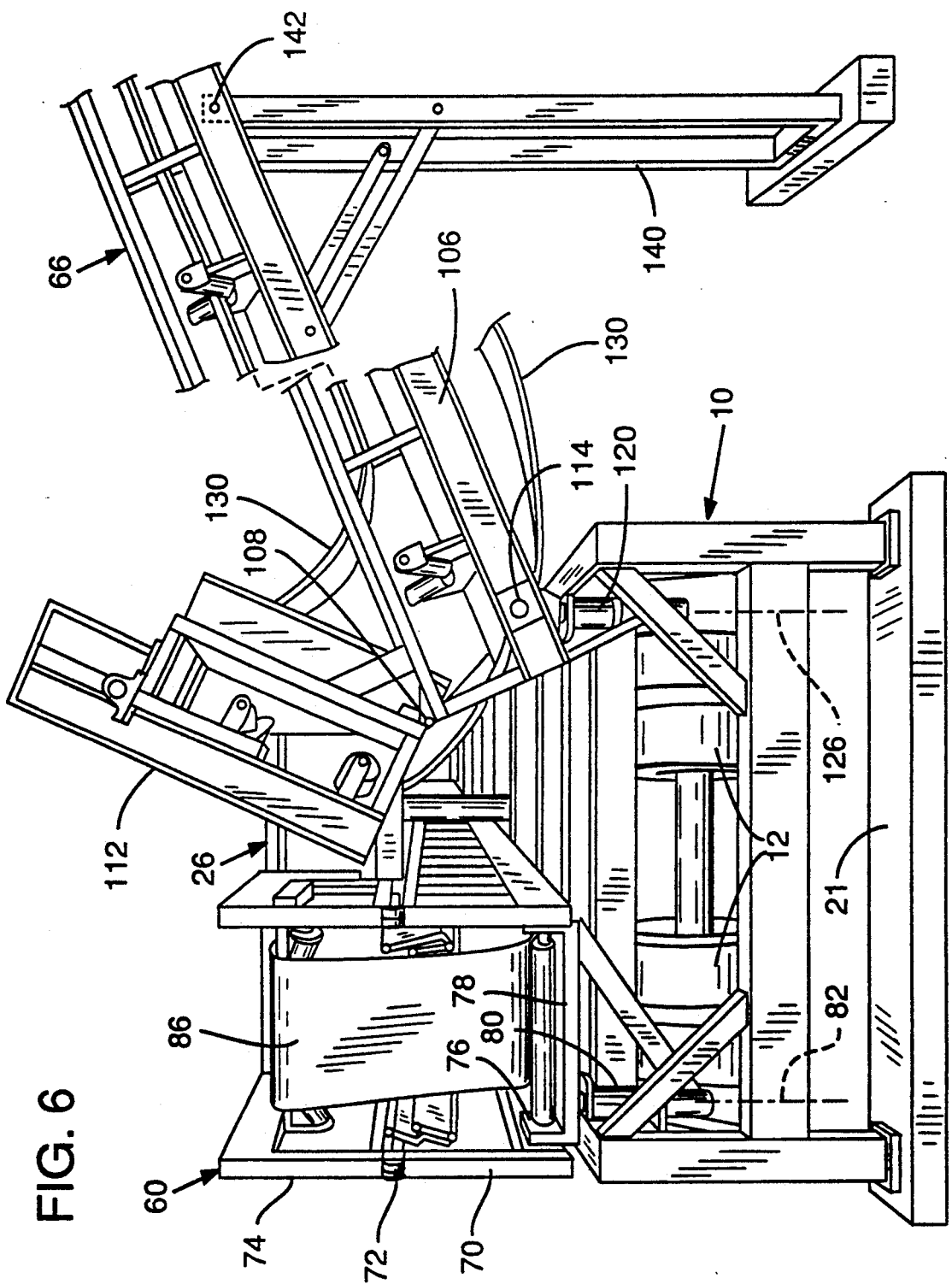
FIG. 6 is an enlarged view of an end of the vehicle.

Referring to FIG. 6, Conveyor frame 70 is supported on a swing section 78 by a pivot mounting 76. Pivot mounting 76 accommodates swinging of conveyor frame 70 about a horizontal axis relative to swing section 78, to raise the free end of the conveyor frame. The swing section is journaled at 80 on the vehicle frame for swinging movement about an upright axis, indicated at 82.

Figure 2:
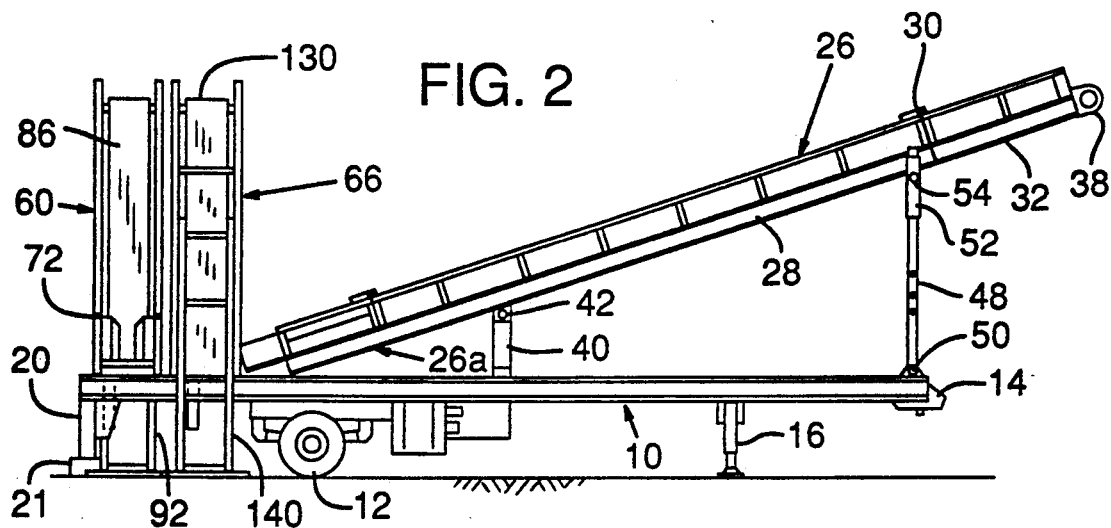
FIG. 2 is a side elevation view of the vehicle shown in FIG. 1.

Conveyor frame 70 may be swung to a position extending laterally outwardly of the vehicle frame, as shown in FIG. 1, with swinging of the conveyor frame and swing section 78 about axis 82.

Lateral-feeding conveyor 60 further includes a belt 86 for conveying material. The belt is supported for movement along the conveyor frame by suitable guide rollers or other means.

Figure 3:
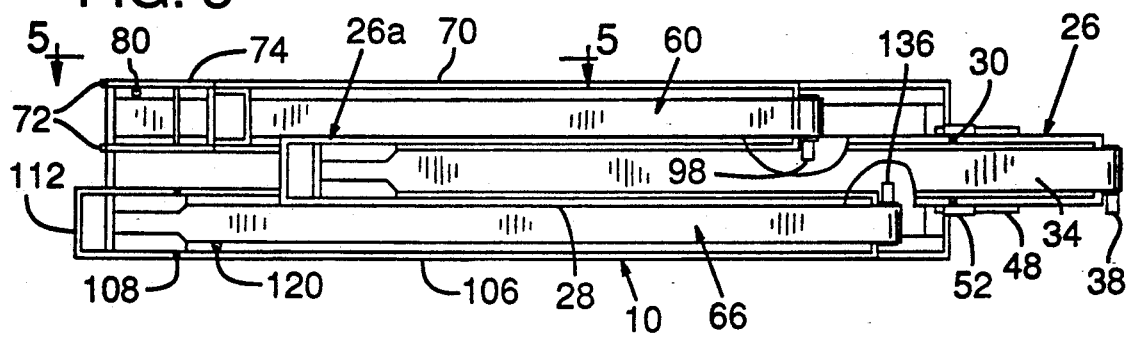
FIG. 3 is a top plan view of the vehicle, with side conveyors in the vehicle in their lowered road transport condition, and with a center conveyor lowered but without folding over of an end.

To shift lateral-feeding conveyor 60 from the road transport position illustrated in FIGS. 3 and 5 to the set up or operative position shown in FIG. 1, supplemental frame 74 is swung about pivot 72 to a position forming an in line extension of conveyor frame 70. This is shown by the dot-dash position of frame 74 in FIG. 5. Frames 70, 74 are then swung about the upright axis 82 afforded swing section 78, to place the conveyor in a position extending laterally of the vehicle frame. With supplemental frame 74 in line with conveyor frame 70, belt 86 extends the entire length of the two frames. Supplemental frame 74 and that part of belt 86 which is supported thereby, is referred to herein as an end expanse of the lateral-feeding conveyor. With the lateral-feeding conveyor in its laterally extending position, the end expanse of the conveyor extends across the width of the vehicle frame and the feed end of longitudinal-feeding conveyor 26.

The lateral-feeding conveyor has its free end raised with pivoting about pivot mounting 76. The conveyor has its free end supported in its raised position by a brace frame 92 (see FIG. 1). The brace frame is pivotally connected to the frame of the lateral feeding conveyor, and with the lateral feeding conveyor in its road transport position, the brace frame folds up to extend underneath side conveyor frame 70.

Powered movement of the belt in the lateral-feeding conveyor is provided by hydraulic motor 98 (see FIG. 1) which is mounted on the conveyor frame and moves with it.

Lateral-feeding conveyor 66 has a construction which resembles in many ways the construction of lateral-feeding conveyor 60 just described. Lateral-feeding conveyor 66 includes an elongate conveyor frame 106 (see FIG. 4). Pivotally connected to an end of this conveyor frame, by pivot 108, is a supplemental frame 112.

The pivoted or rear end of frame 106 is pivotally mounted at 114 (see FIG. 5) on a swing section 116 (with pivot 114 permitting swinging of frame 106 about a longitudinal axis. The swing section is journaled by journal 120 for relative swinging movement with respect to the vehicle frame about an upright axis 126.

The lateral-feeding conveyor 66 includes a belt 130 for moving material therealong. The valve is guided for movement by suitable means such as guide rollers.

Powered movement of belt 130 is produced by hydraulic motor 136 (see FIG. 1) supported on frame 106.

To shift lateral-feeding conveyor 66 from its road transport to its set up or operative position. Frame 112 is swung upwardly about pivot 108 to a partially folded position as shown in FIG. 5, to provide clearance. Frame 106 is swung about axis 126 to place it in a position extending laterally outwardly. Supplemental frame 112 is then returned to a lowered position with pivoting about pivot 108. Frames 106, 112 are swung about pivot mounting 114 to raise the free end of the lateral-feeding conveyor which is the forward end with the feeding conveyor in its road transport position as illustrated in FIG. 3. With lateral-feeding conveyor 66 in its set up position, belt 130 extends throughout the entire length of the conveyor. That portion of the belt which is supported on supplemental frame 112 is referred to herein as an end expanse of the conveyor. This end expanse extends across the width of the vehicle at a location directly in advance of the end expanse of lateral-feeding conveyor 60, and directly rearwardly of the feed end of longitudinal feeding conveyor 26.

Lateral-feeding conveyor 66 is supported in its raised position by brace frame 140 (see FIG. 6). This frame is pivotally connected at 142 to the framework of the lateral-conveyor, and with the feeding conveyor in its road transport position, it is stored by folding it up under the framework of the conveyor. With the conveyor in its operative or set up position, the brace frame is swung downwardly to provide the requisite support.

An engine and hydraulics compartment is shown at 150. Here an engine is housed, and pump means driven by the engine produce pressure fluid for running hydraulic motors and performing other functions in the vehicle.

It will be noted that with the three conveyors in their set up position, all have feed ends which are mutually adjacent at the feed or access zone of the vehicle, which as earlier described is that region over the vehicle frame immediately to the rear of wheels 12. All conveyors have considerable length, and have an upward incline extending to free ends. The lateral-feeding conveyors permit the production of piles of material cascading from the free ends of these conveyors located at substantial distances outwardly from the sides of the vehicle frame, with these piles located well rearwardly from the pile of material produced by the longitudinal-feeding conveyor. With the various conveyors in their road transport position, the conveyors occupy positions closely stacked one beside the other. End expanses of the respective conveyors are folded over to reduce the overall length of the respective conveyors. A compact organization is produced which is stable and imparts to the vehicle a desired roadability.

While an embodiment of the invention has been described, obviously variations and modifications are possible that come within the scope of the invention.

I claim:

1. A conveyor vehicle comprising:
   an elongate vehicle frame and wheel support for the frame accommodating movement of the frame over the ground,
   first and second elongate lateral-feeding conveyors disclosed in a road transport position where the conveyors extend longitudinally of the vehicle frame,
   an elongate longitudinal-feeding conveyor disposed in a road transport position where the conveyor extends longitudinally of the conveyor frame and parallels the lateral-feeding conveyors,
   said lateral-feeding and longitudinal-feeding conveyors each having a pivoted end and a free end, and said pivoted ends of the respective conveyors being located adjacent one end of the vehicle frame,
   a mounting for the pivoted end of the first lateral-feeding conveyor providing for swinging of the conveyor to place it in a set up position with the conveyor swinging about an upright axis and about a horizontal axis,
   a mounting for the pivot end of the second lateral-feeding conveyor providing for swinging of the conveyor to place it in a set up position with the conveyor swinging about an upright axis and swinging about a horizontal axis,
   and a mounting for the longitudinal-feeding conveyor for swinging of the conveyor to place it in a set up position where the conveyor swings about a horizontal axis.

2. The conveyor vehicle of claim 1, wherein each of said lateral-feeding and longitudinal feeding conveyors is a belt conveyor, and each includes a power-driven conveyor belt, and which further includes a motor means for each conveyor producing powered movement of the belt in the conveyor and mounted on the conveyor for movement with the conveyor.

3. The conveyor vehicle of claim 1, wherein the first and second lateral-feeding conveyors in their said transport positions are disposed with one extending along one side of the vehicle frame and one extending along the opposite side of the vehicle frame.

4. The conveyor vehicle of claim 3, wherein the longitudinal-feeding conveyor in its said road transport position is disposed above the lateral-feeding conveyors with the lateral-feeding conveyors in their said road transport position.

5. The vehicle of claim 4, wherein the first lateral-feeding conveyor in its said road transport position extends adjacent one side of the vehicle frame and said mounting for said first lateral-feeding conveyor provides for swinging about an upright axis located adjacent said one side of the vehicle frame, said first lateral-feeding conveyor having an end expanse that extends across the vehicle frame with the first lateral-feeding conveyor in its said set up position, and wherein said second lateral-feeding conveyor in its said road transport position extends along the opposite side of the vehicle frame and said mounting for the second lateral-feeding conveyor provides for swinging movement about an upright axis disposed adjacent said opposite side of the vehicle frame, said second lateral-feeding conveyor having an end expanse which extends across the vehicle frame with the second lateral-feeding conveyor in its said set up position.

6. A conveyor vehicle comprising:
   an elongate vehicle frame and wheel support for the frame accommodating movement of the frame over the ground,
   an elongate first lateral-feeding conveyor having a mounted end and an opposite free end, and a first mounting structure mounting said mounted end of the conveyor on the vehicle frame at a location adjacent one end of the vehicle frame, said first lateral-feeding conveyor having a road transport position where the conveyor overlies the vehicle frame and extends longitudinally along one side of the vehicle frame and said first mounting structure providing for swinging of the first lateral-feeding conveyor to place the conveyor in a set up position extending laterally beyond said one side of the vehicle with the conveyor swinging about an upright axis with swinging of the free end laterally and swinging about a horizontal axis to raise the free end, an elongate second lateral-feeding conveyor having a mounted end and an opposite free end, and a second mounting structure mounting said mounted end of the second lateral-feeding conveyor on the vehicle frame at a location adjacent one end of the vehicle frame and on the opposite side of the vehicle frame, said second lateral-feeding conveyor having a road transport position with the conveyor overlies the vehicle frame and extends longitudinally along the opposite side of the vehicle frame, said second mounting structure providing for swinging of the second lateral-feeding conveyor to place the conveyor in a set up position extending laterally of the vehicle toward the opposite side of the vehicle with the conveyor swinging about an upright axis and with swinging about a horizontal axis to raise the free end, and an elongate longitudinal-feeding conveyor having a road transport position where the conveyor extending along the length of the vehicle in stacked relation above the first and second lateral-feeding conveyors, said longitudinal-feeding conveyor having a mounted end and a free end, and a third mounting structure mounting said mounted end of the longitudinal-feeding conveyor at a location adjacent said one end of the vehicle frame, said mounting structure accommodating swinging of the longitudinal-feeding conveyor about a horizontal axis to raise the free end of the longitudinal-feeding conveyor and to place the longitudinal-feeding conveyor in a set up position.

7. The conveyor vehicle of claim 6, wherein said first lateral-feeding conveyor with the conveyor in its said set up position has an end expanse extending across the vehicle frame, and said second lateral-feeding conveyor in its said set up position has an end expanse extending across the vehicle frame.

8. The conveyor vehicle of claim 7, wherein at least one of said lateral-feeding conveyors includes a remainder portion, and said end expanse of said one lateral-feeding conveyor is hingedly connected to said remainder portion to enable at least partial folding of the end expanse of said one lateral-feeding conveyor over the remainder portion of said one lateral-feeding conveyor.

* * * * *